United States Patent
Li

(10) Patent No.: US 6,216,356 B1
(45) Date of Patent: Apr. 17, 2001

(54) CLASPING STRUCTURE OF THE TAPELINE ANTISKIDDING PAD

(76) Inventor: Shih Lin Li, No. 22, Lane 81, Sec. 2 Tunha South Road, Taipei (TW)

(*) Notice: Subject to any disclaimer, the term of this patent is extended or adjusted under 35 U.S.C. 154(b) by 0 days.

(21) Appl. No.: 09/346,957

(22) Filed: Jul. 2, 1999

(51) Int. Cl.[7] .................................................. G01B 3/10
(52) U.S. Cl. ............................................................ 33/768
(58) Field of Search ............................... 33/758, 768, 769

(56) References Cited

U.S. PATENT DOCUMENTS

| | | | |
|---|---|---|---|
| 4,908,954 | * 3/1990 | Johnson | 33/768 |
| 5,230,159 | * 7/1993 | Lipsey | 33/768 |
| 5,746,004 | * 5/1998 | Wertheim | 33/769 |

* cited by examiner

Primary Examiner—G. Bradley Bennett
(74) Attorney, Agent, or Firm—Pro-Techtor International Services

(57) ABSTRACT

The instant invention provides a clasping structure of the tapeline antiskidding pad which comprises a tapeline body, an antiskidding pad, and bolts. The edge of the tapeline body has a concave part engraved in U-shape, with connecting holes on both edge surfaces. The side surface of the antiskidding pad, which also has a U-shape in accord with shape of the concave part, has antiskidding veins and the edge surfaces have apertures. When the antiskidding pad is connected to the concave part on the edge of the tapeline body, the apertures on the antiskidding pad will align with the connecting holes on the concave part. With the help of inserting the bolts through both the apertures and the connecting holes, the antiskidding pad will be tightly connected to the edge of the tapeline body. The antiskidding pad of the present invention takes a U-shape to increase the antiskidding area so that the tapeline is not easy to slip out of the user's hand in application. The tapeline also has a variety of colors for selection to get a better looking.

6 Claims, 4 Drawing Sheets

CLASPING STRUCTURE OF THE TAPELINE ANTISKIDDING PAD

BACKGROUND OF THE INVENTION

1. Field of the Invention

The present invention relates to a clasping structure of the tapeline antiskidding pad and, in particular, to a clasping structure of the tapeline antiskidding pad that firmly fixes the antiskidding pad on the body of the tapeline.

2. Description of the Prior Art

The tapeline antiskidding structure of the prior art takes special machines and modules to directly form antiskidding veins on the body while ejaculatory molding. However, the special machines and modules are expensive and uneasy to make, thus the production is limited and not cost-effective. People also put wales or grooves on the relevant parts on the module main body by electric discharge or sculpting, so that the wale or groove antiskidding veins will be mapped onto the envelope of the tapeline body. The above mentioned antiskidding veins can increase the user's friction to hold the tapeline and to prevent from dropping and damaging the tapeline due to the user's slippery sweating hands.

Nevertheless, the above mentioned antiskidding veins and the tapeline body are made of hard plastics, thus the antiskidding effect is limited. After a long time of use, the grooves of the antiskidding veins will be filled by the user's sweat and dirt and therefore lose their antiskidding function. Furthermore, the antiskidding structure made by the ejaculatory molding is not only deficient in its antiskidding effect but also needs higher cost in manufacturing.

To resolve the aforementioned problems in the antiskidding veins of the prior art, some also wrap the antiskidding pad directly onto the tapeline body. Although this method can greatly increase the user's holding friction to achieve the antiskidding effect via improving the pad material, yet the antiskidding pad should be attached according to certain methods, such as gluing, high frequency wave, or ultrahigh frequency wave, depending upon the material.

Consequently, these products require more time in installation, and the antiskidding pad is still possible to depart from the tapeline body after a long time. So even the above mentioned product has the antiskidding function, but it is not easy to install and the whole tapeline has to be replaced once the antiskidding pad is broken.

For another structure of the antiskidding pad, please refer to the U.S. Pat. No. 5,746,004. The structure of the patent is a concave part on the tapeline body and an elastic handle covering on top of the concave part. The antiskidding function is achieved by the elastic handle. Analogous to what mentioned before, the patent needs special machines and modules with high cost to mount the elastic handle onto the concave part. Therefore its production is limited and needs higher cost, which is not cost-effective at all.

Pursuant to claim 4 in the specification of the patent, the connection of the elastic handle and the tapeline body is achieved by gluing it onto the concave part. Furthermore, the elastic handle has two pieces that are fixed by glue during the manufacture of the tapeline body.

Accordingly, the elastic handle is only a simple embodiment. To have a better appearance of the tapeline, it is necessary to make the installation procedure tedious by requiring more details in gluing the elastic handle. Moreover, the gluing procedure for the elastic handle asks for extra time for concretion, which causes inconvenience in manufacturing. Also, the elastic handle fixed by glue might come off after frequent uses and require gluing all over again, which is not ideal in application.

The above objects of the prior art still have many defects and are not ideal designs, therefore, it is imperative to make some improvement. In observation of the drawbacks in the tapeline antiskidding structure of the prior art, the inventor of the present invention made efforts to improvement and modification and finally succeeded in providing the instant clasping structure of the tapeline antiskidding pad after many years of research and hardworking.

SUMMARY OF THE INVENTION

The present invention provides a clasping structure of the tapeline antiskidding pad which combines the antiskidding pad onto the tapeline body by bolts. This structure has the advantage of easy installation and taking off, which is a breakthrough of traditional technique, which fixes the antiskidding pad onto the tapeline body only with the help of special machines and modules.

Furthermore, the instant invention provides a clasping structure of the tapeline antiskidding pad, which takes a U-shape antiskidding pad to increase the antiskidding area and the user's comfort in holding so that the tapeline is not easy to slip out of the use's hand.

Yet, the invention provides a clasping structure of the tapeline antiskidding pad with different colors of the tapeline bodies, antiskidding pads, and bolts, which can provide colorful varieties by various combinations.

Moreover, the invention provides a clasping structure of the tapeline antiskidding pad, which has the features of easy installation and uninstallation, simple structure and work time saving so as to achieve the goal of lowering the manufacturing cost while increasing the extra values.

The clasping structure of the tapeline antiskidding pad with the above merits comprises a tapeline body, an antiskidding pad, and bolts. The edge of the tapeline body has a concave part engraved in U-shape, with connecting holes on both edge surfaces. The side surface of the antiskidding pad, which has a shape in accord with the U-shape of the concave part, has antiskidding veins, and the edge surfaces have apertures. When the antiskidding pad is connected to the concave part on the edge of the tapeline body, the apertures on the antiskidding pad will align with the connecting holes on the concave part. With the help of inserting the bolts through both the apertures and the connecting holes, the antiskidding pad will be tightly connected to the tapeline body.

BRIEF DESCRIPTION OF THE DRAWINGS

The drawings disclose an illustrative embodiment of the present invention which serves to exemplify various advantages and objects hereof, and are as follows.

Figure 1:
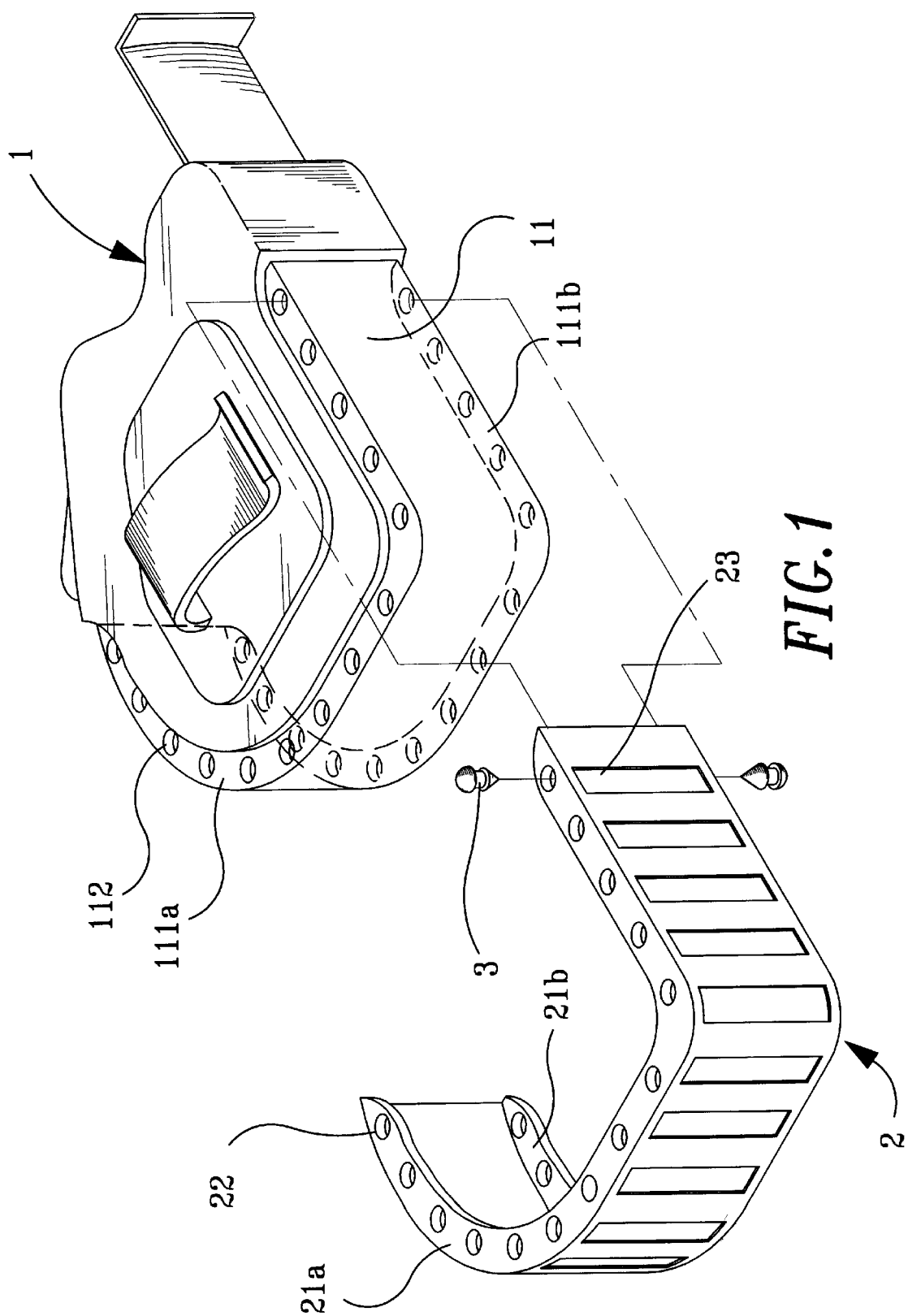
FIG. 1 is a decomposed diagram of the clasping structure of the tapeline antiskidding pad according to the present invention.

MAIN SYMBOLS 1 tapeline body
11 concave part

111*b* edge surface
111*a* edge surface
112 connecting hole
2 antiskidding pad
21*b* edge surface
21*a* edge surface
22 aperture
23 antiskidding veins
3 bolt
31*b* lumpish part
31*a* lumpish part
5 palm

DETAILED DESCRIPTION OF THE PREFERRED EMBODIMENT

Figure 2:
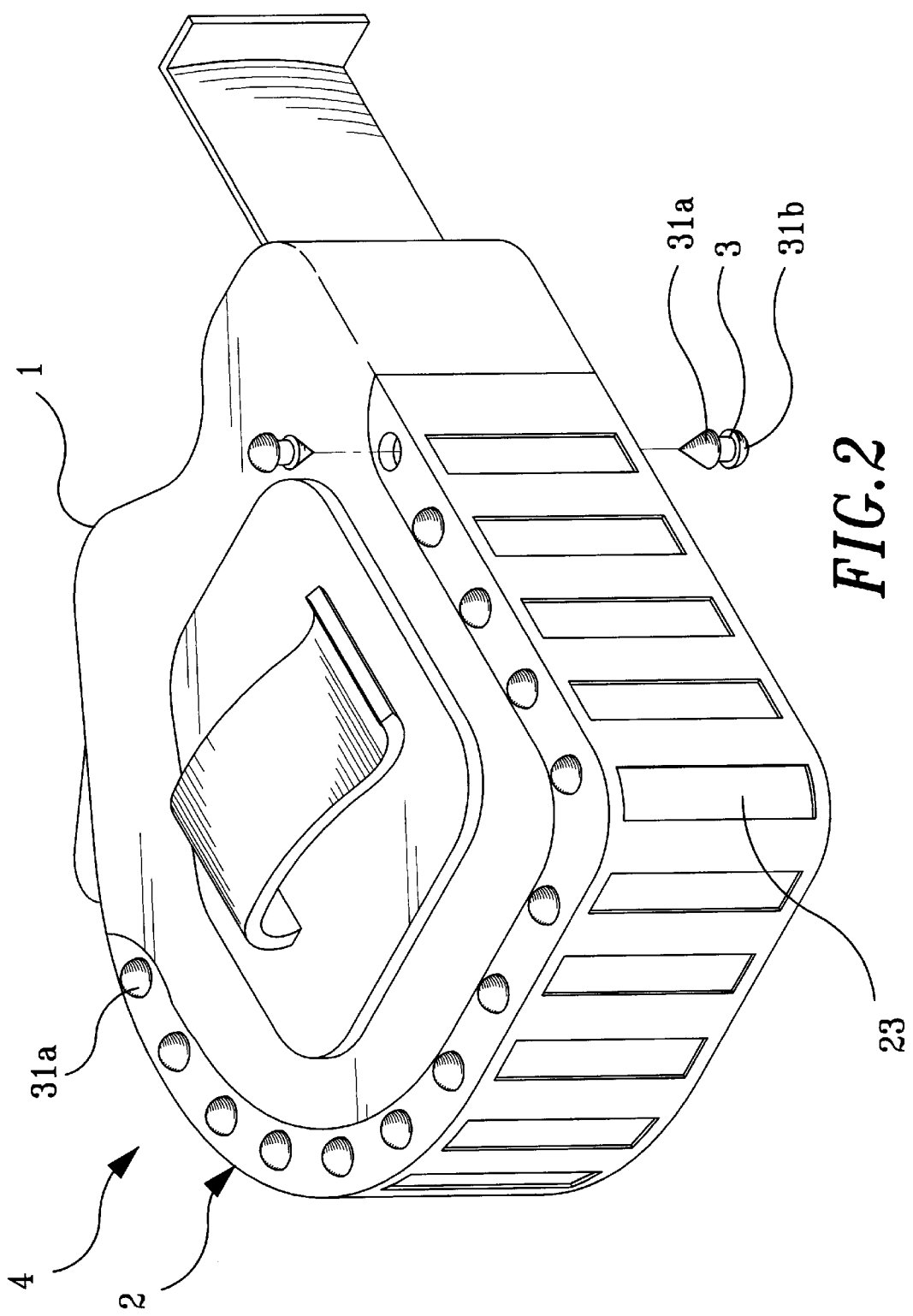
FIG. 2 is a three-dimensional perspective of the clasping structure of the tapeline antiskidding pad according to the present invention.

Please refer to FIG. 1 and FIG. 2, which are the decomposed diagram and three-dimensional perspective of the clasping structure of the tapeline antiskidding pad according to the present invention, respectively. The invention comprises a tapeline body 1, an antiskidding pad 2, and a number of bolts 3, wherein the edge of the tapeline 1 has a concave part 11, which is in U-shape and has a number of connecting holes 112 on its two edge surfaces 111*a* and 111*b*. The antiskidding pad 2 is also in U-shape, in accord with the concave part 11, and has antiskidding veins 23 on its side surface and a number of apertures 22 on its two edge surfaces 21*a* and 21*b*. When the antiskidding pad 2 is connected to the concave part 11 on the edge of the tapeline body 1, the apertures 22 on the antiskidding pad 2 will align with the connecting holes 112 on the concave part 11. With the help of inserting a number of bolts 3 through the apertures 22 and connecting holes 112, the antiskidding pad 2 will be tightly fixed onto the edge of the tapeline body 1. Thus, with the above simple structure, one can quickly perform installation or uninstallation procedures of the antiskidding pad, which is easy, convenient, and greatly improves the comfort of using the tapeline.

Figure 3:
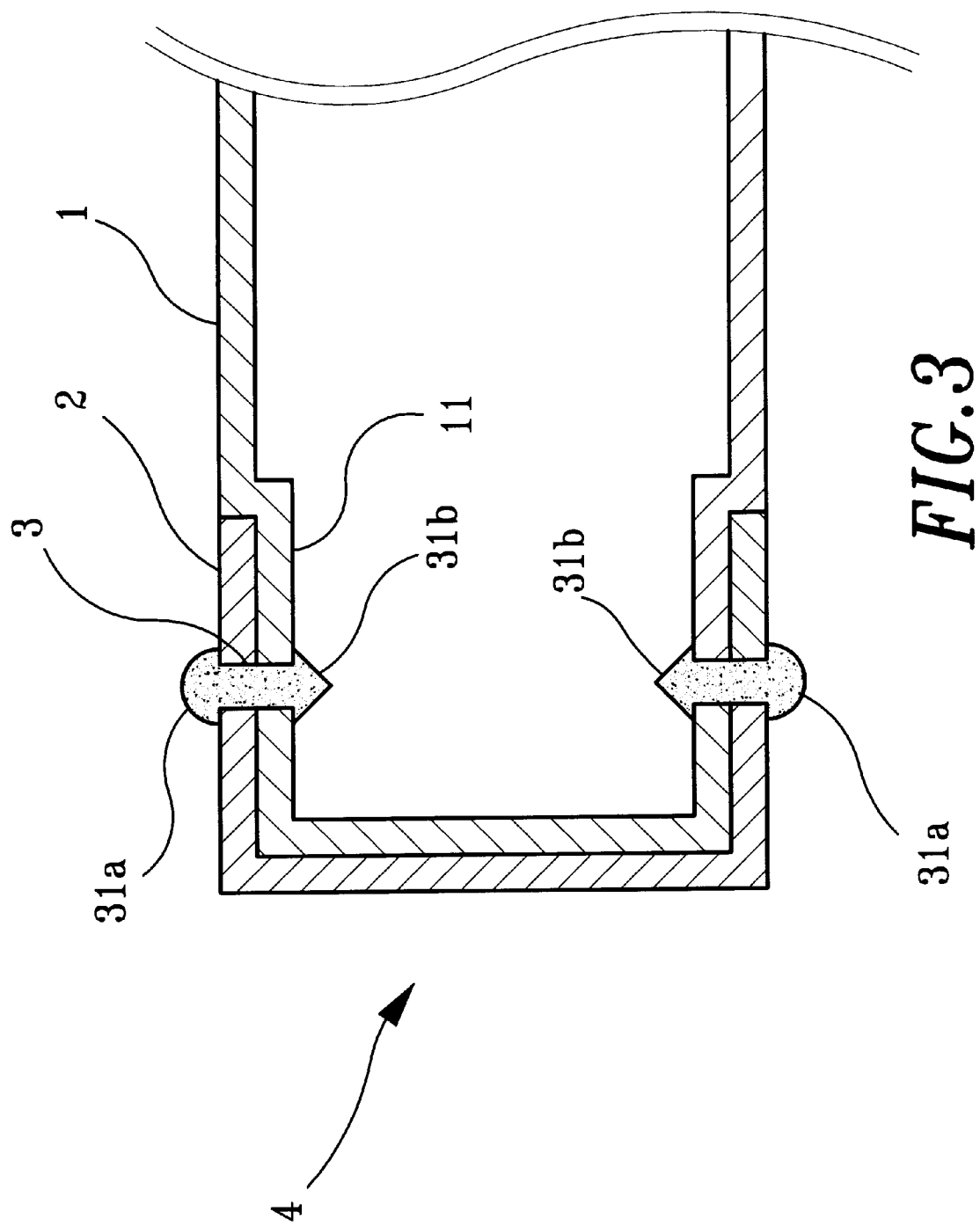
FIG. 3 is a cross-sectional diagram of combining the clasping structure of the tapeline antiskidding pad according to the present invention.

Please refer to FIG. 3, which is a cross-sectional diagram of combining the clasping structure of the tapeline antiskidding pad according to the present invention. The bolt 3 can be made of soft materials, such as rubber, and has lumpish parts 31*a* and 31*b* on each end. The lumpish part 31*b* is conical, going through the aperture on the antiskidding pad 2 and the connecting hole on the tapeline body 1 and appearing inside the tapeline body 1; while the lumpish part 31*a* is semispherical and staying on the edge surface of the antiskidding pad 2. So the antiskidding pad 2 can be tightly attached to the tapeline body 1 without falling off.

Figure 4:
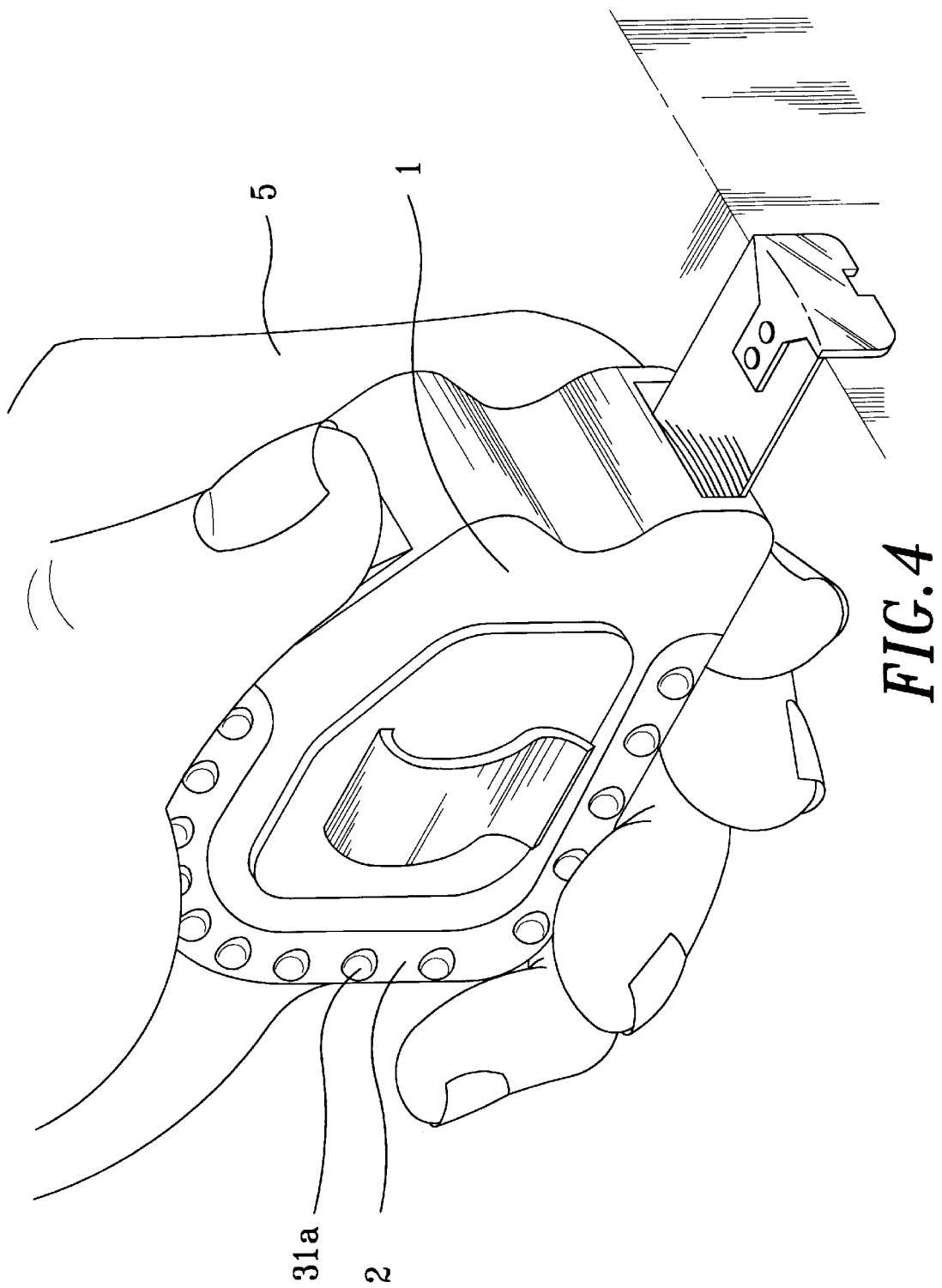
FIG. 4 is a diagram of an embodiment of the clasping structure of the tapeline antiskidding pad according to the present invention.

Please refer to FIG. 4, which is a diagram of an embodiment of the clasping structure of the tapeline antiskidding pad according to the present invention. The antiskidding pad 2 is in U-shape and can be made of rubber to increase both the user's comfort in holding and the antiskidding area so that the tapeline is not easy to slip out of the user's palm 5. The tapeline body 1, antiskidding pad 2, and bolt 3 can have different colors so that the products can come in various combinations with different visual effects to stimulate the user's purchase. So this invention is a product with good practicability and appearance.

The clasping structure of the tapeline antiskidding pad according to the instant invention, when compared with the above cited patent and other prior art, has the following merits:

1. This invention firmly fixes the antiskidding pad onto the tapeline body with the bolts, without the help of glue. So the antiskidding pad can be rapidly installed onto or taken off from the tapeline body to achieve the goals of simultaneously decreasing the work time and lowering the cost.
2. The antiskidding pad is made in U-shape to increase the antiskidding area so that the tapeline is not easy to slip off the user's palm. This invention has a better practicability and increases the user's holding comfort.
3. The tapeline body, antiskidding pad, and bolt can be made with different colors so that the product can come in various combinations with different visual effects to the users. Aside from the practicability, this adds an extra value of good appearance to the product.

Many changes and modifications in the above described embodiment of the invention can, of course, be carried out without departing from the scope thereof Accordingly, to promote the progress in science and the useful arts, the invention is disclosed and is intended to be limited only by the scope of the appended claims.

What is claimed is:

1. A clasping structure of a tapeline antiskidding pad, comprising:
   a tapeline body, wherein said tapeline body has a concave part with a plurality of connecting holes, an antiskidding pad, a side surface of said antiskidding pad has veins and two side surfaces of said antiskidding pad each have a plurality of apertures;
   a plurality of fasteners;
   wherein said antiskidding pad is connected onto said concave part on said tapeline body, with said plurality of apertures on said antiskidding pad aligning with said plurality of connecting holes on said concave part, such that said plurality of fasteners passes through said plurality of apertures and said plurality of connecting holes, so that said antiskidding pad is firmly fixed onto said tapeline body, such that
   said antiskidding pad completely covers a rear side of said tapeline body and said antiskidding pad covers more than one-half of a top and a bottom side of said tapeline body.
2. The clasping structure of the tapeline antiskidding pad as claimed in claim 1, wherein:
   said concave part of said tapeline body is U-shaped.
3. The clasping structure of the tapeline antiskidding pad as claimed in claim 2, wherein:
   said antiskidding pad is is U-shaped.
4. The clasping structure of the tapeline antiskidding pad as claimed in claim 1, wherein:
   each said bolt has lumpish parts on both ends, wherein a first one of said lumpish parts is conical for going through said aperture on said antiskidding pad and said connecting hole on said concave part and coming out inside said tapeline body, and a second one of said lumpish parts is exposed on said antiskidding pad.
5. The clasping structure of the tapeline antiskidding pad as claimed in claim 1, wherein:
   said plurality of bolts are made of elastic material.
6. The A clasping structure of the tapeline antiskidding pad claimed in claim 1, wherein:
   said antiskidding pad is made of elastic material.

\* \* \* \* \*